(12) United States Patent  
Yuan et al.

(10) Patent No.: US 11,835,445 B2  
(45) Date of Patent: Dec. 5, 2023

(54) WELDING SEAM TRACKING SENSOR

(71) Applicant: TANGSHAN YINGLAI TECHNOLOGY CO., LTD., Tangshan (CN)

(72) Inventors: Lei Yuan, Tangshan (CN); Zhijun Zhao, Tangshan (CN); Tongle Zang, Tangshan (CN); Ensong Zheng, Tangshan (CN); Wenhao Yao, Tangshan (CN); Yanhui Wang, Tangshan (CN)

(73) Assignee: TANGSHAN YINGLAI TECHNOLOGY CO., LTD., Tangshan (CN)

( * ) Notice: Subject to any disclaimer, the term of this patent is extended or adjusted under 35 U.S.C. 154(b) by 129 days.

(21) Appl. No.: 17/718,277

(22) Filed: Apr. 11, 2022

(65) Prior Publication Data

US 2023/0304920 A1   Sep. 28, 2023

(30) Foreign Application Priority Data

Mar. 28, 2022   (CN) .......................... 202210314102.5

(51) Int. Cl.
*G01N 21/15* (2006.01)
(52) U.S. Cl.
CPC ....... *G01N 21/15* (2013.01); *G01N 2021/151* (2013.01)

(58) Field of Classification Search
CPC .......................... G01N 2021/151; G01N 21/15
USPC .................................................. 356/300–343
See application file for complete search history.

(56) References Cited

U.S. PATENT DOCUMENTS

2011/0142719 A1 *   6/2011   Goldstein ............ G01N 21/783
422/83

* cited by examiner

*Primary Examiner* — Tri T Ton
(74) *Attorney, Agent, or Firm* — Nitin Kaushik

(57) ABSTRACT

The present invention provides a welding seam tracking sensor, which belongs to the technical field of sensors, and alleviates the problem of detection performance reduction of a sensor. The welding seam tracking sensor comprises a sensor housing, a protection cover and a protection sheet; the protection cover is mounted on the bottom of the sensor housing, an air inlet is provided on the upper surface of the protection cover, and a blowing hole is provided on the bottom of the sensor housing. The air inlet and the blowing hole is closely connected; there is a visual hole and a laser hole in the bottom of the protection cover, a transverse slot is formed inside the protection cover, a socket is opened on the side wall of the protection cover, the protection sheet is inserted into the slot through the socket.

10 Claims, 6 Drawing Sheets

WELDING SEAM TRACKING SENSOR

TECHNICAL FIELD

The present invention relates to a sensor, in particular to a welding seam tracking sensor.

BACKGROUND ART

Weld seam tracking sensors are mainly used in fields like welding and grinding, to detect information such as the position and width of welds. Welding generates a lot of welding fume, spatters and other substances that are not conducive to the detection of the sensor, the welding fume and spatters will adhere to the sensor protection lens, blocking the sensor from performing laser emission and image acquisition, so it is necessary to purge the welding fume for the protection lens to extend its service life.

For the existing purge method, an air channel is formed between the window protection sheet 101 and the installation cover 102, and an air hole 103 needs to be made in the window protection sheet 101, as shown in FIG. 1. The purge gas enters the air channel below the window protection sheet through the air hole 103 of the window protection sheet 101 from the top of the window protection sheet 101, and is discharged from the laser hole 104 and the visual hole 105 of the installation cover 102.

The purge gas cannot be completely filtered, and it contains a small amount of moisture and oil. When the purge gas is blown out from the air outlet 107 in the housing 106, a part of the gas will enter the cavity formed by the laser window sheet 108, visual window sheet 109 and window protection sheet 101 along the slit between the window protection sheet 101 and the housing 106. The moisture and oil in the gas will adhere to the surfaces of the laser window sheet 108 and the visual window sheet 109, causing the light from the laser structure to be scattered and the sensor image to be blurred, thereby reducing the detection performance of the sensor.

SUMMARY OF THE INVENTION

The purpose of the present invention is to provide a welding seam tracking sensor, which can alleviate the problem of detection performance reduction of a sensor.

The present invention provides a welding seam tracking sensor, comprising a sensor housing, a protection cover and a protection sheet;

The protection cover is mounted on the bottom of the sensor housing, the upper surface of the protection cover is provided with an air inlet, the bottom of the sensor housing is provided with a blowing hole, and the air inlet is closely connected with the blowing hole;

The bottom of the protection cover is configured with a visual hole and a laser hole, a transverse slot is formed inside the protection cover, a socket is opened in the side wall of the protection cover, and the protection sheet may be inserted into the slot through the socket, therefore an air channel is formed between the lower surface of the protection sheet and the protection cover, and the air inlet is connected with the air channel;

The purge gas is blown out from the blowing hole, enters the air channel through the air inlet, and is discharged from the visual hole and the laser hole.

Further, a slit is formed between the upper edge of the visual hole and the laser hole and the lower surface of the protection sheet.

Further, an airflow guide slop is formed along the outer walls of the visual hole and the laser hole.

Further, a top ball is mounted on the protection cover, and when the protection sheet is inserted into the slot, the top ball will press the lower surface of the protection sheet.

Further, the bottom of the sensor housing is provided with a sheet-pressing boss, and when the protection sheet is inserted into the slot, the sheet-pressing boss will press the upper surface of the protection sheet.

Further, the sheet-pressing boss has an insertion guide slop formed along the insertion direction of the protection sheet.

Further, a touch switch is provided at the bottom of the sensor housing, and the touch switch is electrically connected to the circuit in the sensor housing;

When the protection sheet is inserted into the slot, the upper surface of the protection sheet will press the touch switch so that the touch switch is closed, to detect whether the protection sheet is inserted.

Further, the touch switch has an insertion guide slop formed along the insertion direction of the protection sheet.

Further, two guide bosses protruding upward are formed on the lower surface of the socket, and the spacing between the two guide bosses is greater than the opening size of the visual hole and the laser hole, to avoid the protection sheet being scratched.

Further, a regulating valve is provided on the sensor housing, used to regulate the flow of the purge gas.

The welding seam tracking sensor provided by the present invention comprises a sensor housing, a protection cover and a protection sheet. The protection cover is mounted at the bottom of the sensor housing, the air inlet of the protection cover is closely connected with the blowing hole at the bottom of the sensor housing, and the protection sheet is inserted into the slot of the protection cover, an air channel is formed between the lower surface of the protection sheet and the protection cover. During purging, the purge gas is blown out from the blowing hole, enters the air channel through the air inlet, and is discharged from the visual hole and the laser hole. The air channel is located under the protection sheet, the purge gas will not flow to above the protection sheet. Once the purge gas contains moisture and oil, it will not touch the visual window sheet and the laser window sheet above the protection sheet, thereby alleviating the problem of detection performance reduction of a sensor. Meanwhile, when the protection sheet is inserted into the slot of the protection cover, it will press the touch switch at the lower end of the sensor housing, so that it is closed, and the internal circuit of the housing connected to the touch switch will be powered, as the result, the sensor will work normally, preventing any damage to the sensor caused by the operator's failing to insert the protection sheet.

BRIEF DESCRIPTION OF THE DRAWINGS

In order to describe the preferred embodiments of the present invention or the technical proposal of the existing technology more clearly, the drawings required to use in the description of the preferred embodiments and the prior art are introduced below. It is obvious that the drawings described below are embodiments of the present invention, on which other drawings may be made available, without any creative effort, to common technician in the field.

DESCRIPTION OF THE PREFERRED EMBODIMENTS

Figure 1:
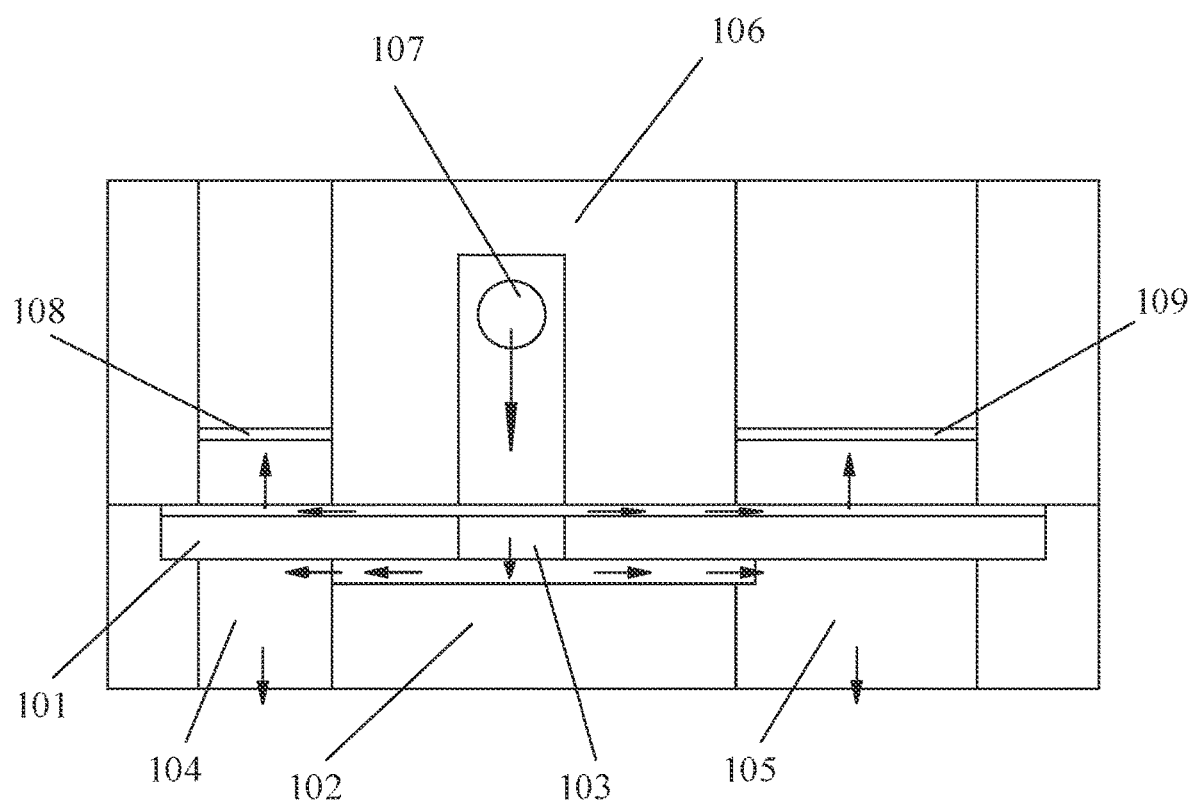
FIG. 1 illustrates the purge gas structure of the existing welding seam tracking sensor.
Figure 2:
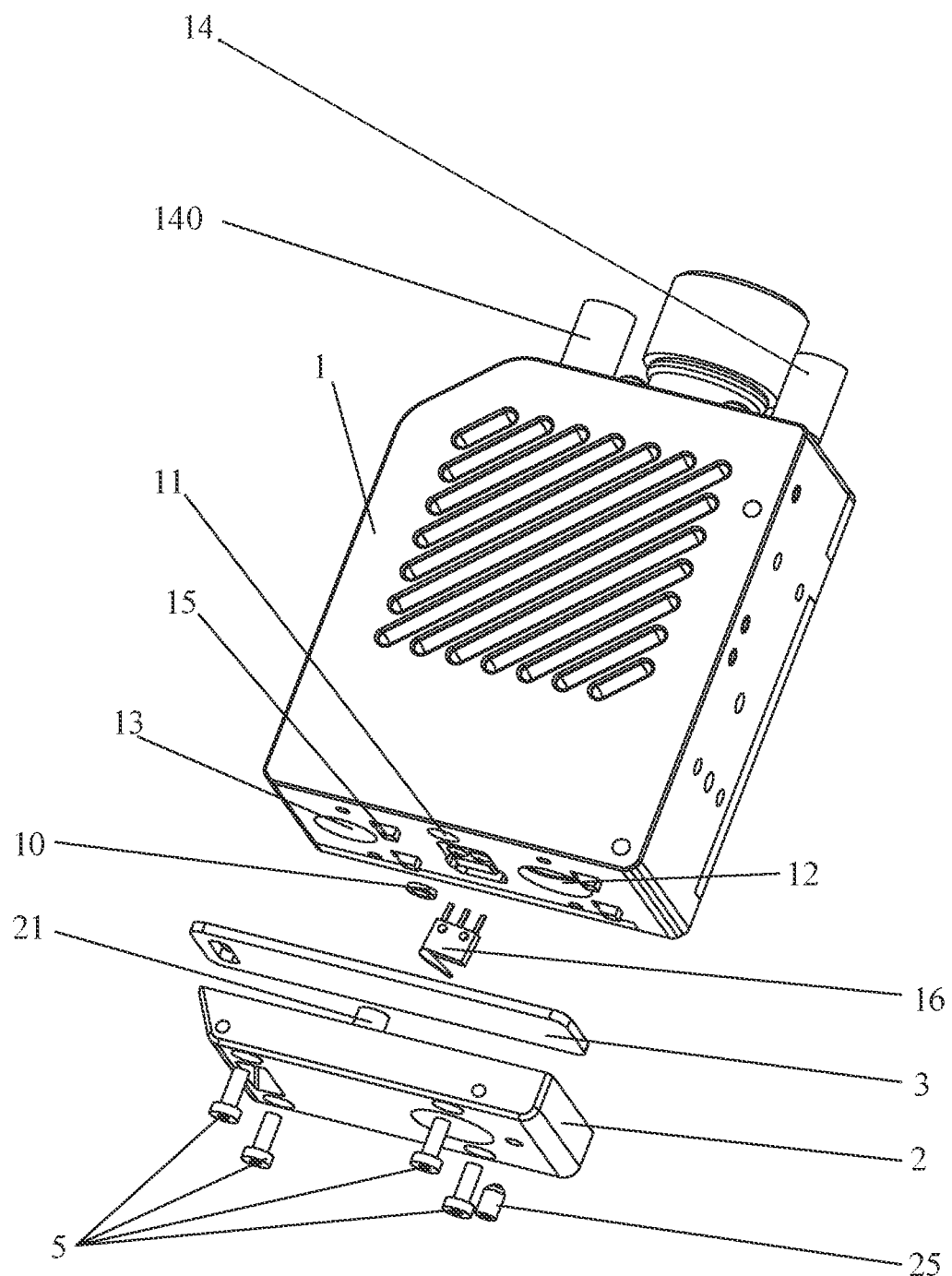
FIG. 2 illustrates the explosion of a weld seam tracking sensor provided in an embodiment of the present invention.
Figure 3:
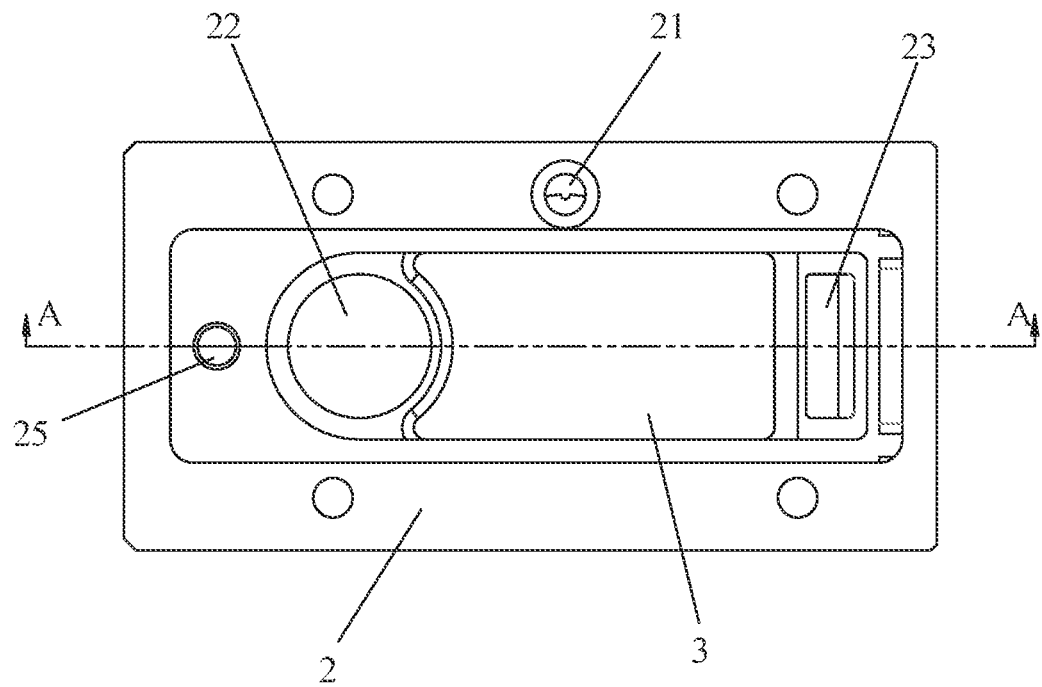
FIG. 3 illustrates the top view of the protection cover and the protection sheet in an embodiment of the present invention.

To further clarify the purpose, technical scheme and advantages of the present invention, a clear and complete description of the technical scheme of the present invention is given below in combination with the attached drawings. Obviously, the described embodiments are part of the embodiments of the present invention and not all of the embodiments. On the basis of the embodiments of the present invention, all other embodiments obtained by a common technician in the field without having performed creative labor are covered by the protection of the present invention.

The terms "including" and "having", and any variation thereof, referred to in embodiments of the present invention are intended to cover non-exclusive inclusion. For example, a process, method, system, product, or equipment consisting of a series of steps or units is not limited to the listed steps or units, but optionally includes other steps or units that are not listed, or optionally includes other steps or units that are inherent to such process, method, product, or equipment.

As shown in FIGS. 2 through 7, an embodiment of the present invention provides a seam tracking sensor, which comprises a sensor housing 1, a protection cover 2 and a protection sheet 3 (also known as a window protection sheet). The protection cover 2 is mounted on the bottom of the sensor housing 1, the upper surface of the protection cover 2 is provided with an air inlet 21, the bottom of the sensor housing 1 is provided with an air blowing hole 11, and the air inlet 21 is closely connected with the air blowing hole 11. In this embodiment, the protection cover 2 is mounted on the bottom of the sensor housing 1 through four screws 5, and a closed air channel is formed between the air inlet 21 and the blowing hole 11 through the sealing ring 10.

Figure 5:
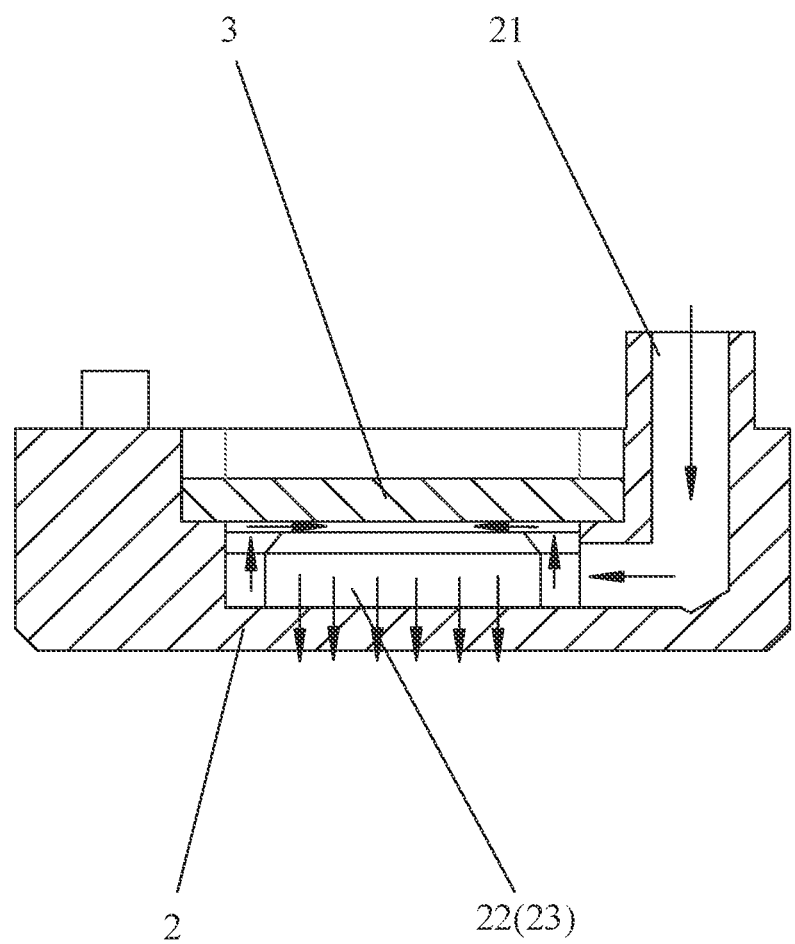
FIG. 5 illustrates the airflow direction in the embodiment of the present invention.

A visual hole 22 and a laser hole 23 are formed at the bottom of the protection cover 2, a transverse slot is formed inside the protection cover 2, a socket 24 is opened in the side wall of the protection cover 2 and the protection sheet 3 is inserted into the slot through the socket 24, so an air channel 40 is formed between the lower surface of the protection sheet 3 and the protection cover 2, and the air inlet 21 is connected with the air channel 40;

During purging, the purge gas enters the sensor housing 1 through the air inlet 140, is blown out from the blowing hole 11, enters the air channel 40 through the air inlet 21, and then is discharged from the visual hole 22 and the laser hole 23, as shown in FIG. 5. The air channel 40 is located under the protection sheet 3, so the purge gas will not flow above the protection sheet 3. Once the purge gas contains moisture and oil, it will neither adhere to the upper surface of the protection sheet 3, nor to the visual window sheet 12 and the laser window sheet 13 above the protection sheet 3, thereby alleviating the problem of detection performance reduction of a sensor.

Figure 4:
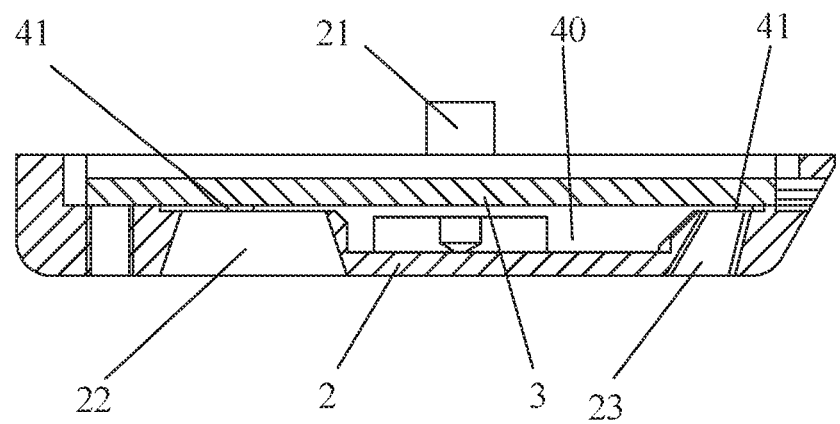
FIG. 4 illustrates the sectional view along A-A line of FIG. 3.

In a possible embodiment, a slit 41 is formed between the upper edge of the visual hole 22 and the laser hole 23 and the lower surface of the protection sheet 3, as shown in FIG. 4. When the protection sheet 3 is inserted, the inner cavity of the protection cover 2 is a wide space, there is a slit 41 at the air outlet of the visual hole 22 and the laser hole 23, the protection sheet 3 and the inner cavity of the protection cover 2 will form a nearly air-tight channel 40, and the air flow in the protection cover 2 is compressed when flowing through the slit 41 in the inner cavity, forming a structure similar to an air knife. The gas may purge the lower surface of the protection sheet 3 more powerfully, making it more difficult for welding spatters and fume to adhere to the lower surface of the protection sheet 3, thereby extending the service life of the protection sheet 3, reducing the replacement frequency of the protection sheet 3 and saving material and labor costs.

In a possible embodiment, an airflow guide slope is formed along the outer walls of the visual hole 22 and the laser hole 23, which allows the gas to enter the slit 41 more smoothly to compress the gas and reduce the gas convection in the cavity; and makes the protection sheet 3 tightly adhered to the lower surface of the sensor housing 1 by means of the gas rising and compression forces, so as to better protect the laser window sheet 13 and the visual window sheet 12.

In a possible implementation manner, the sensor housing 1 is provided with a regulating valve 14 which is connected to the gas channel inside the sensor housing 1, and is used for regulating the flow of the purge gas. During purging, the air outlet flow of the blowing hole 11 on the lower part may be adjusted by the regulating valve 14 as needed, so as to control the purging effect.

In a possible implementation, a top ball 25 is mounted on the protection cover 2. When the protection sheet 3 is inserted into the slot, the top ball 25 will press the lower surface of the protection sheet 3 to provide upward pressure to the protection sheet 3.

Figure 6:
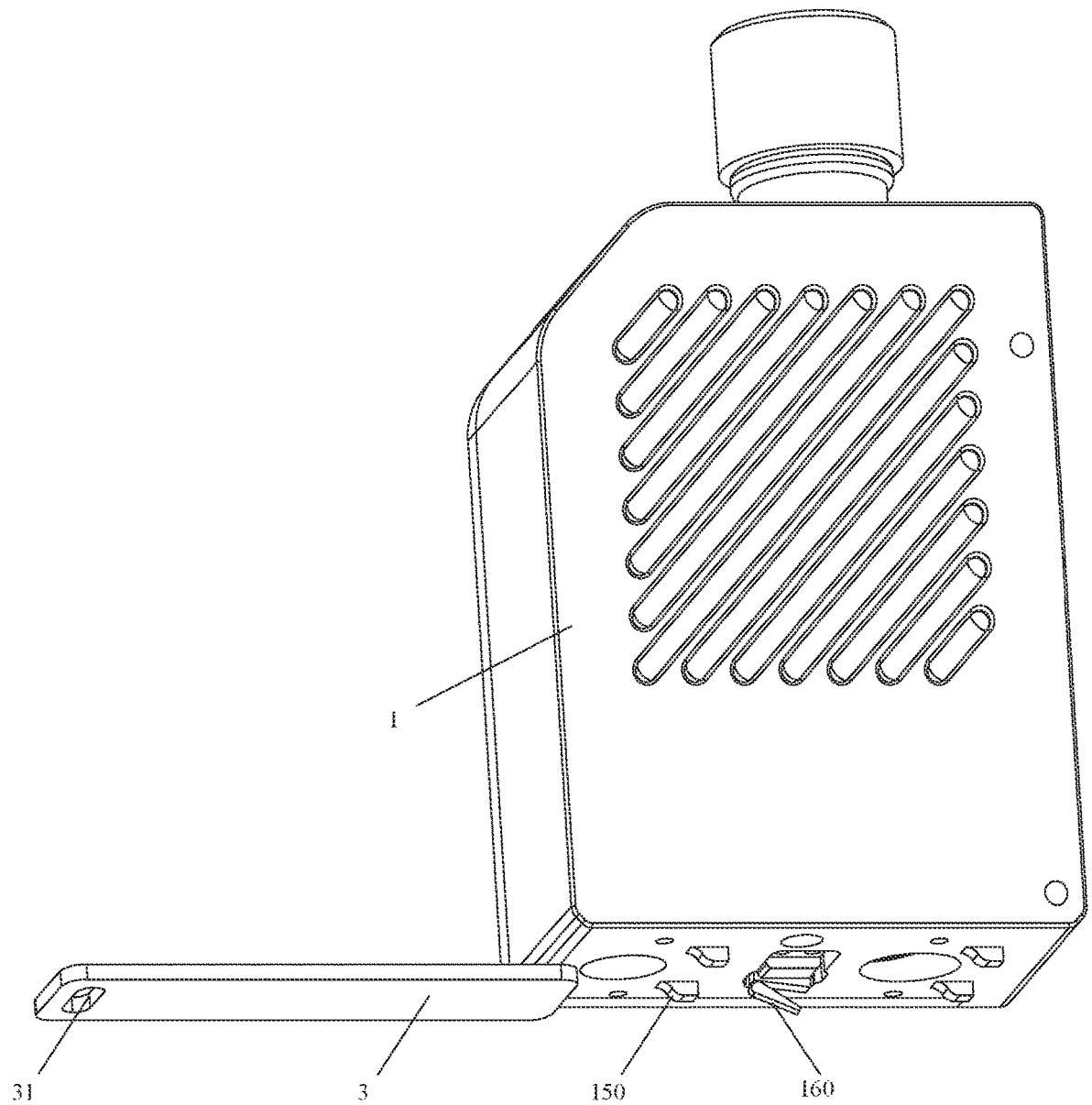
FIG. 6 is another schematic diagram of a seam tracking sensor provided in the embodiment of the present invention.

In a possible embodiment, the bottom of the sensor housing 1 is provided with a sheet-pressing boss 15. When the protection sheet 3 is inserted into the slot, the sheet-pressing boss 15 will press the upper surface of the protection sheet 3, to provide downward pressure to the protection sheet 3, as shown in FIG. 6.

Further, the sheet-pressing boss 15 has an insertion guiding slope 150 formed along the insertion direction of the protection sheet 3. The sheet-pressing boss 15 on the sensor housing 1 may not only pressing the protection sheet 3, but also functions with its insertion guide slope 150 formed along the direction in which the protection sheet 3 is inserted, which prevents scratching on the surface protection sheet 3 while facilitating the insertion of the protection sheet 3.

In a possible implementation, the bottom of the sensor housing 1 is provided with a touch switch 16, which is electrically connected to the circuit in the sensor housing 1, and may detect whether the protection sheet 3 is mounted. When the protection sheet 3 is inserted into the slot, the upper surface of the protection sheet 3 will press the touch switch 16, so that the touch switch 16 is closed. In this case, the sensor may detect that the protection sheet 3 is mounted, and the sensor works normally; when the protection sheet 3 is pulled out, the touch switch 16 will be disconnected, the sensor may detect that the protection sheet 3 is not mounted, and it will alarm, preventing working without the protection sheet 3 inserted, and avoiding the window sheet of the sensor itself from being damaged or contaminated.

In a possible implementation, when the protection sheet 3 is inserted, the touch switch 16 is closed, the internal circuit of the sensor will be powered, and the work indicator, laser, camera, etc. may work normally; when the protection sheet 3 is pulled out, the touch switch 16 is opened, the internal circuit of the sensor will be disconnected, the work indicator, laser, camera, etc. cannot work normally, and an alarm signal will be sent at the same time.

Further, the touch switch 16 has a contact guide slope 160 formed along the insertion direction of the protection sheet 3, and the contact guide slope 160 is also in the insertion direction of the protection sheet 3 which has the same function as the insertion guide slope 150 of the sheet-pressing boss 15, namely preventing scratching on the surface of the protection sheet 3 while facilitating the insertion of the protection sheet 3.

Figure 7:
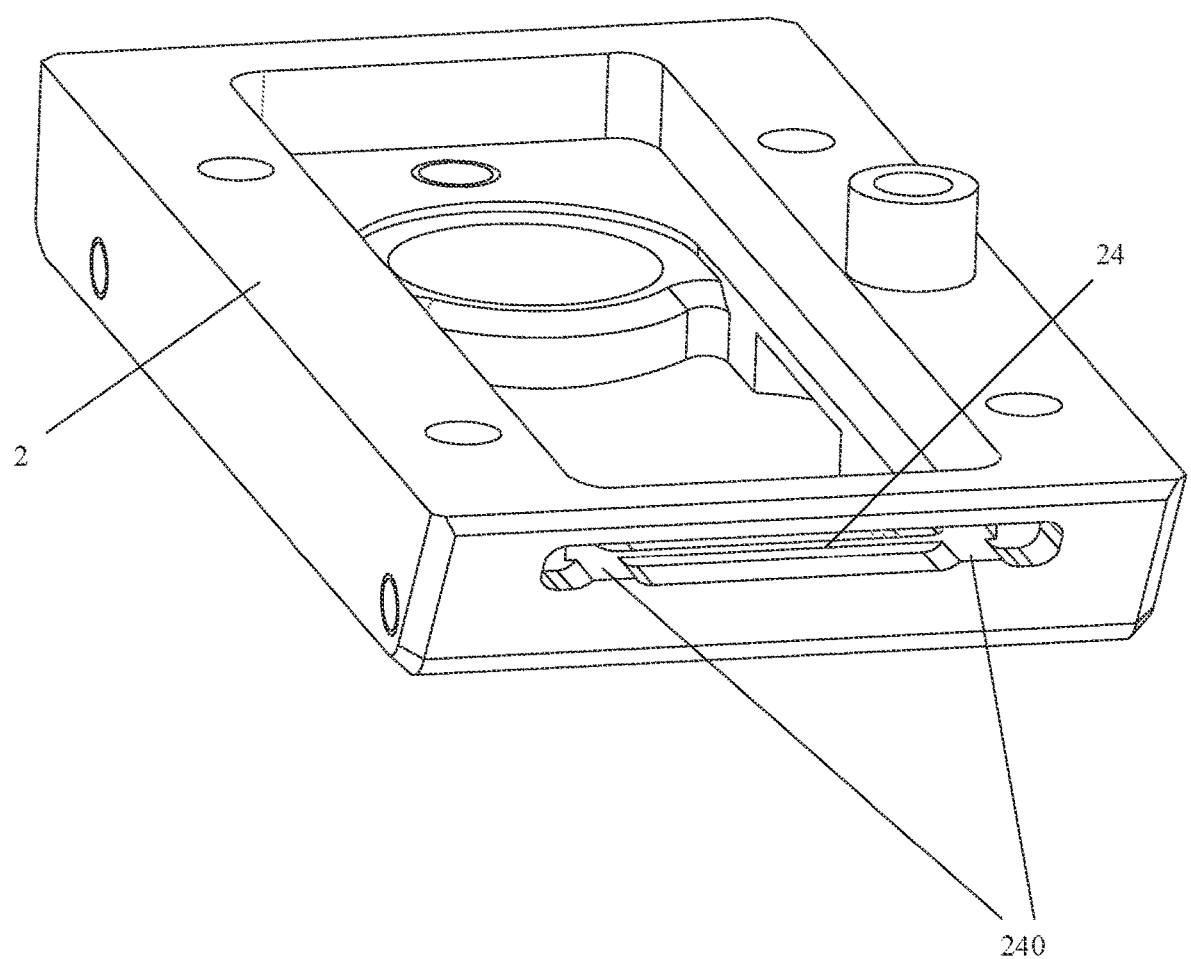
FIG. 7 is a schematic diagram of a socket in an embodiment of the present invention.

In a possible embodiment, two guide bosses 240 protruding upward are formed on the lower surface of the socket 24, and the spacing between the two guide bosses 240 is greater than the opening size of the visual hole 22 and the laser hole 23, as shown in FIG. 7. When the protection sheet 3 is inserted into the protection cover 2, scratches will inevitably generate on the surface of the protection sheet 3, which will interfere with visual inspection. In the embodiment of the present invention, guide bosses 240 are arranged on both sides of the socket 24, and the spacing between the guide bosses 240 is greater than the opening size of the visual hole 22 and the laser hole 23, so that the visual detection will not be affected even if scratches generate, as they are located on the sides of the visual hole 22 and the laser hole 23.

In a possible implementation, the exposed end of the protection sheet 3 has a slot hole 31, which is convenient for the user to insert and pull out the protection sheet 3. The protection sheet 3 adopts a plug-in installation method, which is convenient and quick without need of disassembling any component. Meanwhile, it cooperates with the guide boss 240 to prevent the scratches of the protection sheet 3 from affecting the visual inspection.

It should be noted that similar numbers and letters represent similar terms in the drawings below. Therefore, once a term is defined in one drawing, there is no need to define or explain it further in the subsequent drawings.

In the description of the present invention, it should be clarified that the location or position relations indicated by the terms "center", "above" and "below", "left", "right" and "vertical", "horizontal", "inside" and "outside" indicates, etc. are based on the location or position shown in the drawings, or those the products derived from the present invention are usually placed when they are in use. Such location or position are given only for the convenience of description and simplification of the prevent invention, and are not intended to indicate or imply that the device or element referred to must have a particular orientation, be constructed and operate in a particular orientation and shall not be construed as a limitation of the present invention. In addition, the use of the terms "first", "second", "third", etc., are only to distinguish descriptions and cannot be understood to indicate or imply relative importance.

In the description of the present invention, it is also necessary to note that, unless otherwise expressly specified and restricted, the terms "set-up", "mounting", "connection" and "coupling" should be understood in a broad sense, for example, they may be a fixed connection, a detachable connection, or an integrated connection; or may be a mechanical connection or an electrical connection; or may be direct connections indirect connections through any medium, or may be an internal connection of two components. For common technicians in the field, the specific meaning of the above terms in the present invention may be understood in a case by case manner.

The last point to be noted is: All the above embodiments are only referred to for the specific implementation of the present invention, which are used to explain the technical solution to the present invention, rather than to pose any limit on it. The scope of protection of the present invention is not limited to this, although a detailed explanation is given for the present invention in reference to the foregoing embodiments. The common technical personnel of this field should understand: Within the scope of the technology disclosed by the present invention, any technician familiar with the field of technology may still modify or easily think of changes to the technical solution recorded in the aforementioned embodiments, or replace part of the technical features with equivalent ones; and such modification, change or replacement will not result in the essence of the corresponding technical solution being out of the scope of the technical solution of the embodiments of the present invention, so they shall be covered by the scope of protection of the present invention. Therefore, the protection scope of the present invention shall be subject to the protection scope defined by the claims.

The invention claimed is:

1. A welding seam tracking sensor comprising a sensor housing, a protection cover and a protection sheet;
   the protection cover is mounted on the bottom of the sensor housing, the upper surface of the protection cover is provided with an air inlet, the bottom of the sensor housing is provided with a blowing hole, and the air inlet is closely connected with the blowing hole;
   the bottom of the protection cover is configured with a visual hole and a laser hole, a transverse slot is formed inside the protection cover, a socket is opened in the side wall of the protection cover, and the protection sheet may be inserted into the slot through the socket, therefore an air channel is formed between the lower surface of the protection sheet and the protection cover, and the air inlet is connected with the air channel;
   the purge gas is blown out from the blowing hole, enters the air channel through the air inlet, and is discharged from the visual hole and the laser hole.

2. The welding seam tracking sensor according to claim 1, wherein a slit is formed between the upper edge of the visual hole and the laser hole and the lower surface of the protection sheet.

3. The welding seam tracking sensor according to claim 1, wherein an air flow guide slop is formed along the outer walls of the visual hole and the laser hole.

4. The welding seam tracking sensor according to claim 1, wherein a top ball is mounted on the protection cover, and when the protection sheet is inserted into the slot, the top ball will press the lower surface of the protection sheet.

5. The welding seam tracking sensor according to claim 1, wherein the bottom of the sensor housing is provided with a sheet-pressing boss, and when the protection sheet is inserted into the slot, the sheet-pressing boss will press the upper surface of the protection sheet tightly.

6. The welding seam tracking sensor according to claim 5, wherein the sheet-pressing boss has an insertion guide slop formed along the insertion direction of the protection sheet.

7. The welding seam tracking sensor according to claim 1, wherein a touch switch is provided at the bottom of the sensor housing, and the touch switch is electrically connected to a circuit in the sensor housing;

when the protection sheet is inserted into the slot, the upper surface of the protection sheet will press the touch switch so that the touch switch is closed, which is used to detect whether the protection sheet is inserted.

8. The welding seam tracking sensor according to claim 7, wherein the touch switch has a contact guide slope formed along the insertion direction of the protection sheet.

9. The welding seam tracking sensor according to claim 1, wherein two guide bosses protruding upward are formed on the lower surface of the socket, and the spacing between the two guide bosses is greater than the opening size of the visual hole and the laser hole.

10. The welding seam tracking sensor according to claim 1, wherein a regulating valve is provided on the sensor housing, which is used to regulate the flow of the purge gas.

\* \* \* \* \*